Inventors: Russel L. Maycock
George M. Hartwig
By: Oswald H. Milmore
Their Attorney Jan. 3, 1956

R. L. MAYCOCK ET AL 2,729,550

METHOD AND APPARATUS FOR CONTACTING
LIQUIDS BY RECIPROCAL DISPERSION

Filed Nov. 9, 1951

Inventors: Russel L. Maycock
George M. Hartwig
By: *Oswald H. Milmore*
Their Attorney United States Patent Office 2,729,550
Patented Jan. 3, 1956

2,729,550
METHOD AND APPARATUS FOR CONTACTING LIQUIDS BY RECIPROCAL DISPERSION

Russel L. Maycock, Oakland, and George M. Hartwig, San Francisco, Calif., assignors to Shell Development Company, Emeryville, Calif., a corporation of Delaware Application November 9, 1951, Serial No. 255,692

20 Claims. (Cl. 23—310)

This invention relates to a method and apparatus for intimately contacting two or more liquids forming two liquid phases having relatively different densities by reciprocal or double dispersion, i. e., by alternately (a) dispersing the first liquid into the second liquid and (b) dispersing the second liquid into the first liquid. More particularly, the invention relates to an improved method and apparatus for intimately contacting such liquids by countercurrent flow of the two liquids through a confined contacting zone bounded on two sides thereof by dispersing members, such as plates having orificial openings, by which a liquid may be introduced as a plurality of small filamentary streams into a body of the other and thereby be dispersed in the latter.

This application is a continuation-in-part of our copending application Serial No. 709,007, filed November 9, 1946 now abandoned.

It has been proposed by van Dijck, in U. S. Patent No. 2,011,186, to improve the contacting of relatively immiscible liquids of relatively different densities by dispersing a heavier liquid downwardly through relatively small openings in a perforated plate and into an extended body of a continuous phase of a second, lighter liquid that is contiguous to the plate and thereafter effecting the reverse or reciprocal operation, wherein the lighter liquid is dispersed upwardly through the openings in such a plate and into an extended body of a continuous phase of the heavier liquid, to attain more efficient contacting, such as in an extraction process. Such a sequence of operations, wherein a liquid A is first dispersed into a continuous body of another liquid B and thereafter the liquid B is dispersed into a continuous body of the liquid A is, for brevity, herein referred to as alternately dispersing each liquid into a continuous body of the other liquid or, still more briefly, as reciprocally dispersing the liquids in each other.

The present invention is in the nature of an improvement on the above van Dijck method and apparatus, but is not restricted to the specific mechanism or flow control operations employed for causing the alternate flow of the liquids through the dispersing members.

When the method and apparatus disclosed in the aforesaid van Dijck patent are employed in countercurrent contacting processes, such as the solvent extraction of lubricating oils and the like, there is a change in the relative volumes of the two liquid phases within the contacting zone defined by the walls of the vessel and two consecutive perforated plates, caused by the transfer of material from one liquid phase to the other or by other causes. For example, when one liquid is oil containing several components and the other is a selective solvent for one of such components, there occurs an at least partial transfer of one or more such components from the oil into the solvent, resulting in a decrease in the volume of the oil phase and an increase in the volume of the solvent phase. This change in relative volumes is progressive as the extraction proceeds and causes a progressive change in the interface level between the layers of the lighter and heavier liquids in each contacting zone until the thickness of one of the bodies of liquid in the contacting zone is reduced to the point at which it no longer serves as an effective continuous phase into which the other liquid may be dispersed from the other side of the perforated plate and attain a significant transfer of solute or component. When that state is reached, which may be attained after a relatively small number of cycles of the alternate dispersions have been carried out, each perforated plate becomes effective only as a one-way dispersion plate which, however, is still considerably more efficient than other methods of contacting.

The following simplified considerations will make it clear why such a state must be reached as indicated above: Consider only a single, restricted contacting zone of fixed volume defined by the walls of a vertical vessel and by an adjoining pair of transverse perforated dispersing plates extending fully across the column. This zone is filled and contains 100 volume units each of a relatively lighter and a heavier liquid, these liquids being stratified with the heavier liquid resting on the lower plate, and liquids in the neighboring contacting zones being similarly stratified so that a layer of heavier liquid in a higher adjoining zone is in contact with the upper side of the upper plate and a layer of lighter liquid in the lower adjoining zone is in contact with the lower side of the lower plate. Assume that the alternate relative motions of the plate and liquids are such as to force 50 volume units of liquid through each plate during each half of the cycle of operation. Assume further that as a result of the indicated dispersions, there is a component (solute) transfer from the lighter to the heavier liquid and that the relative volume of the lighter liquid decreases while that of the heavier liquid increases, the absolute volume changes being equal. Now, simultaneously with the dispersion of 50 volumes of lighter liquid from the said lower zone upwardly through the lower plate into the defined zone, 50 volumes of lighter liquid will be dispersed out of the defined zone upwardly through the upper perforated plate. But the dispersion of 50 volumes of the lighter liquid into the defined zone increases the light phase by less than 50 (say only by 40) volumes due to solute transfer from the lighter liquid to the heavier liquid. Thus, with an intake of only 40 volumes of lighter liquid and a loss of 50 volumes of this liquid by upward flow out of the zone, there is a net loss of, say 10 volumes of the lighter phase, leaving now only 90 volumes of lighter phase in said zone. Simultaneously, the volume of the heavier phase is increased and now amounts to 110 volumes. Furthermore, each subsequent dispersion, regardless of which is the dispersed phase, results in a similar transfer of solute and an additional loss of volume of lighter phase in the contacting zone. It is clear, therefore, that eventually the volume of the lighter liquid in a given restricted contacting zone at a given time will become so small that the depth of the body of lighter phase lying next to the upper perforated dispersion plate will not be sufficient for effectively contacting the heavier liquid when the latter is dispersed downwardly into said zone from the upper plate; thus, it has been found that during such downward dispersion of the heavier liquid the jets debouching from the openings pass entirely through the thin layer of lighter liquid and into the lower body of heavier liquid without any appreciable transfer of solute from one liquid to the other.

In addition to the loss of an effective body of one of the liquids A, into which the other liquid B can be dispersed, the absence of a sufficient depth of one of the liquids A, in contact with the perforated plate results in the passage of both liquids A and B through the plate during the part of the cycle when that one liquid A, alone should be passed therethrough. Thus, when in the example of the foregoing paragraph the volume of the lighter liquid remaining in the restricted contacting zone is less than 50 volumes, say 30 volumes, and 50 volumes of liquid flow upwardly through each dispersion plate in the course of half a cycle, all of the 30 volumes of lighter liquid are forced through the upper perforated plate early during this part of the cycle, bringing the heavier liquid into contact with the plate and resulting in the upward flow of 20 volumes of the latter through the perforated plate. This recycle or return flow of a portion of one of the liquids B, into a body of the same liquid B, in a previous zone from which it had previously been dispersed, represents a loss in capacity in two ways: First, recycling of liquid B reduces directly the net throughput thereof, and second, since the total volume of liquid forced through the plates per half-cycle is fixed, any recycle of the liquid B decreases the amount of the other liquid A that is dispersed. This recycling reduces the efficiency of contacting because of mixing of a portion of liquid B that is relatively rich in solute with the body of liquid B that is relatively lean in solute, thus undoing part of the extraction that was previously accomplished.

As already indicated, other factors than relative concentrations of a given substance which is at least partially soluble in both of the liquid phases cause similar changes in relative volumes of the two liquid phases in the restricted contacting zones and, consequently, reduce the operation of a reciprocal or double dispersion process to an effectively single dispersion operation (wherein the dispersion of one liquid in a single direction only is effective for achieving intimate contact, the alternate dispersion in the opposite direction being ineffective). Thus, temperature changes and fluctuations in the flow in the contactor may cause relative volume changes.

It is, therefore, an object of the present invention to provide an improved method and apparatus for intimately contacting two counter-flowing at least partially immiscible liquids having relatively different densities wherein each fluid is alternately and effectively dispersed into a continuous body of the other. Another object is to provide such method and apparatus for contacting two at least partially immiscible liquids by reciprocal dispersion wherein separate bodies of substantial depth of both liquids are maintained during an extended sequence of alternate dispersions. A further object is to provide apparatus for alternately dispersing two counter-flowing liquids, one into the other, simultaneously at two or more consecutive dispersing members affording restricted flow passages and means adapted to maintain substantially automatically a predetermined constant liquid-liquid interface level between the two liquids, said level being substantially intermediate the two dispersing members.

Other objects will become apparent from the following description.

In summary, the method of the present invention comprises flowing two at least partially immiscible, relatively lighter and heavier liquids countercurrently through a series of dispersion members that are spaced apart to provide intervening confined contacting zones by establishing within each zone a continuous body of each of the two liquids, so that corresponding sides of all dispersion members are in contact with bodies of one liquid and the other sides of said members are in contact with bodies of the other liquid, and alternately (a) dispersing lighter liquid through each dispersing member into the body of heavier liquid adjoining the respective dispersion member and (b) dispersing the heavier liquid through each dispersing member into the body of lighter liquid adjoining the respective dispersion member. The improvement according to the invention resides in maintaining both the continuous bodies of the two liquids within each confined zone at substantial depths despite changes in the relative volumes of the liquid by alternately increasing and decreasing the effective volume of one or more confined contacting zones in synchronism with the alternate dispersions, the volume being increased during the dispersion of the liquid that decreases in volume and being increased during the dispersion of the liquid that increases in volume. For example, when the heavier liquid is a solvent that increases in volume by transfer of solute from the lighter liquid, the effective volume of the contacting zone is increased each time the lighter liquid is dispersed and such volume is decreased each time the heavier liquid is dispersed. The amount of the change in effective volume is made such that the contacting zone between consecutive dispersing members contains substantially the same volume of each of two bodies of liquid before and after a completed cycle of alternate dispersions. The change in effective volume may take place gradually, contemporaneously with the respective dispersion, or more rapidly to be effectuated during a minor part of the time taken by the respective dispersion, e. g., at the early part thereof or, preferably, during the last part thereof.

The alternate increase and decrease in the effective volume of a contacting zone increases and decreases, respectively, the combined volumes of the two bodies of liquid within the contacting zone between consecutive perforated dispersing plates.

The effect of altering the effective volume may be understood by considering one cycle of operation. During the first half-cycle a volume $V_1$ of the liquid A that tends to decrease in volume relatively to the second liquid B is dispersed into a continuous body of the second liquid B in a given contacting zone through one of the dispersing members thereof; during this half-cycle the effective volume of the said zone is increased by an amount $\Delta V$, so that the volume of the liquid A that is simultaneously expelled from the same zone through the other dispersing member thereof into the adjoining contacting zone is equal to $(V_1 - \Delta V)$. During the next half-cycle, a volume $V_2$ (which may be equal to or different from $V_1$) of liquid B is dispersed into the continuous body of liquid A in the said contacting zone and the effective volume of the said zone is decreased by the amount $\Delta V$, resulting in the expulsion from the zone of an amount of the liquid A equal to $(V_2 + \Delta V)$. The value of $\Delta V$ is such as to maintain substantially the same volume of liquid A before and after a complete cycle of alternate dispersions; since the effective volume of the zone at the corresponding part of each cycle is the same, the volume of the liquid B will then also be the same as at the start of the cycle. In most cases the ratio of $V_1$ to $V_2$ is governed by the relative volumes of the liquids A and B that are flowed through the system, as will be explained hereinafter. Hence, the method according to the invention may also be described as regulating the quantity of liquid dispersed out of one or more contacting zones in relation to the quantity of the same liquid that is simultaneously dispersed into the same zone.

It is, of course, not essential that an exactly constant level be maintained within each compartment or contacting zone; the objects of the invention are realized when the tendency to deplete one of the continuous bodies of liquid is stopped. Hence, the magnitudes of the alternate volume changes may be adjusted from time to time, and it is desirable but not necessary that the effective volume of every contacting zone be alternately varied; nor is it necessary that the volume be increased or decreased with each cycle of alternate dispersions. Thus, while it is preferred to go through one cycle of alternate expansion and contraction of the contacting zone during each cycle of alternate dispersions, it is possible to expand and contract the zone every second or third cycle of alternate dispersions.

The method may be carried out in apparatus providing a series of chambers serially connected through openings in dispersing members. Thus, the apparatus may comprise an elongated, preferably upright, vessel provided with a pair of feed communicating lines near the two ends thereof, respectively, and with a pair of withdrawal communicating lines near the two ends thereof, respectively, for the liquids to be contacted, a plurality of dispersion members, such as plates having orificial openings of any desired shape, e. g., circular or slot-like, for the discharge of the liquid as small drops or as filamentous jets that are disrupted into droplets by the drag imposed thereon upon flow through the continuous body of the other liquid, said dispersing members being arranged within the vessel to divide it into a plurality of compartments along its long axis, and means for causing oscillatory relative movement between the liquids and the dispersion members. Additional inlets between the ends may be provided for feeding additional liquids, and additional withdrawal lines may be similarly provided. One or more of the compartments, which form the confined contacting zones, are provided with means for altering the effective volumes thereof, i. e., they are constructed as expansible chambers. The invention is not restricted to any specific mechanism for altering the effective volumes of the confined contacting zones such as those described in detail herein by way of illustration.

The means for altering the volumes may comprise either a movable wall that limits the compartment or zone in part, such as a piston, bellows, reciprocable plunger or other displacement member that occupies a variable portion of the chamber, or mechanism for moving the dispersing plates alternately closer together and farther apart. A movable wall may be provided by placing into communication with the confined zone a cylinder having a reciprocable piston, whereby one piston face forms the movable wall and the space within the cylinder forms a part of the effective volume of the contacting zone. Other devices, such as expansible bellows having adjustable springs or other tension means, etc., may, of course, be employed. Further, each contacting zone that is constructed as an expansible chamber may have one or more than one movable wall; thus, there may be two separate cylinders or the like, one arranged to communicate near the top of the zone to operate on the lighter liquid alone and the other near the bottom to operate on the heavier liquid. Of course, when using a single cylinder for any given zone, it may communicate with any level thereof.

The means for altering the effective volume of the contacting zone is advantageously provided with adjustable means for limiting the extent of the volume change, i. e., $\Delta V$, such as a stop limiting the movement of the piston or plunger. It is preferred to provide means for automatically positioning such adjustable means in accordance with the level of the apparent interface within the respective contacting zone or in a selected intermediate contacting zone.

The means for causing oscillatory relative movement between the liquids and the dispersion members may be of any desired type. This relative movement is one wherein the liquids, on the one hand, move relatively to the dispersion members, on the other hand, alternately in opposite directions, e. g., upwards during one half-cycle and downwards during the other half-cycle; each of these movements is necessarily accompanied by passage of liquid through the openings in the dispersion members, and it is these alternate movements that bring about the above-noted alternate dispersions. In the simplest embodiment, this means may consist of the feed pumps for charging the liquids to the ends of the apparatus under suitable pressure sufficient to cause dispersion, together with control means therefor and independently operable valves on the withdrawal lines, whereby during one half-cycle a selected volume of the lighter liquid, less than the volume thereof contained in each contacting zone, is admitted at one end of the apparatus, lighter liquid is dispersed through each dispersing member, and lighter liquid is withdrawn from the other end while both the feed and withdrawal of the heavier liquid are stopped, and during the next half-cycle the heavier liquid is similarly admitted, dispersed and withdrawn while the flow of the lighter liquid is stopped. It was found, however, that it is usually desirable to disperse through the dispersing plates during each half-cycle a volume of liquid that is somewhat greater than the volume of the same liquid that is admitted into the apparatus during the same half-cycle; to achieve this it is preferable to provide the apparatus with additional means for causing a relative oscillatory movement between the liquids and dispersing members. Such means may be pumps, such as rotary pumps connected to accumulator tanks or reciprocating pumps, the pumps connected to the opposite ends of the apparatus, or a mechanism for moving the perforated plates up and down, as disclosed in the aforesaid van Dijck patent.

Having set forth the nature of the invention in a general manner, several preferred embodiments thereof will now be described in detail with particular reference to the accompanying drawing which is a part of this specification, wherein.

Figure 1:
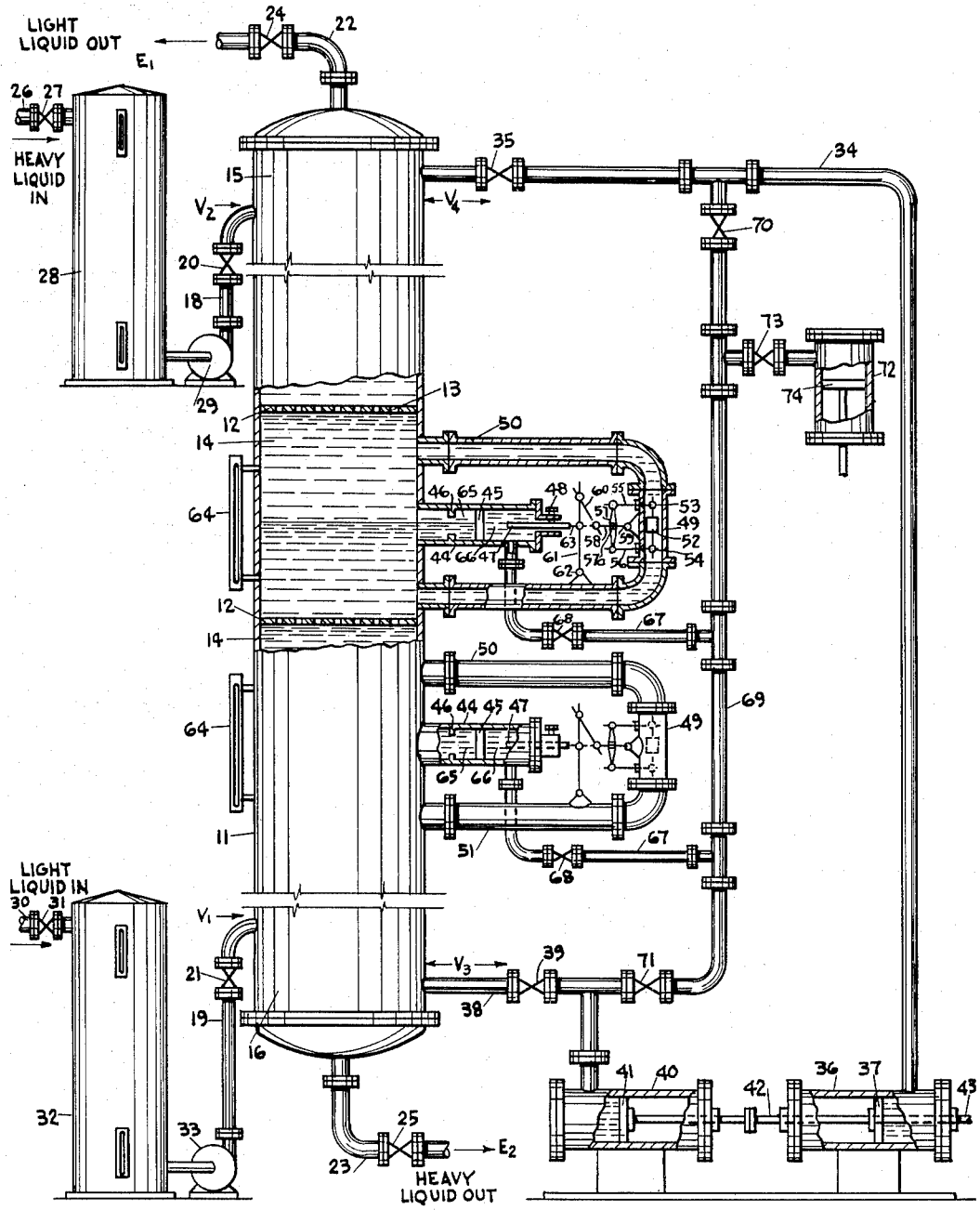
Fig. 1 is an elevation view, partly in section, of an apparatus according to the invention employing reciprocable pistons for altering the volumes of the contacting zones.

The apparatus shown in Fig. 1 is designed for intimately contacting a lighter liquid with a heavier one moving countercurrently through the column 11 which is fitted internally with a plurality of substantially horizontal dispersing plates 12 having orificial restricted openings 13. The plates divide the column into: a series of confined compartments 14 that constitute the intermediate contacting zones and are disposed one above the other; an upper settling zone 15 above the uppermost plate; and a lower settling zone 16 beneath the lowermost plate. These settling zones also serve as contacting zones. The perforated plates are sealed at their peripheries to the inside wall of the column, or otherwise secured to form a liquid-proof seal with the wall, so that the only communication between the contacting zones is through the openings 13. Thus, the openings 13 form restricted flow zones through which the contacting zones are serially connected. The upper and lower settling zones are provided with communicating feed conduits 18 and 19, respectively, having valves 20 and 21, and with communicating withdrawal conduits 22 and 23, respectively, having valves 24 and 25. Heavy liquid is supplied from a source, not shown, through a supply conduit 26 having a valve 27 and through any suitable metering device such as a measuring tank 28 from which it is fed into the feed conduit 18 by a pump 29. Similarly, light liquid is supplied through a conduit 30, valve 31, measuring tank 32 and pump 33. The upper settling zone 15 further communicates through a conduit 34 and valve 55 with the cylinder of a reciprocating pump surge 36 having a movable piston 37. The lower settling zone 16 further communicates through a conduit 38 and valve 39 with the cylinder of a reciprocating surge pump 40 having a movable piston 41. The pistons 37 and 41 are connected by any suitable means, such as a connecting shaft 42 and are driven from a common driving mechanism (not shown) by a shaft 43. The pistons are thus seen to move in unison and have the same strokes, but since the pistons are oppositely disposed, the pumps operate 180° out of phase with each other. The cross-sectional areas of the pumps 36 and 40 may be made the same or different, as shown, in accordance with the desired relation between the volumes displaced thereby.

It is evident that when the pistons 37 and 41 are reciprocated they cause alternate up and down movement of the liquids through the column relative to the dispersing plates. Thus, with the valves 35 and 39 open, movement of these pistons to the left draws liquid out of the top of the column via conduit 34 and forces liquid into the bottom of the column via conduit 38; the result is an upward flow of liquids through the column relative to the dispersing plates 12. The subsequent movement of these pistons to the right causes flow of liquids in the opposite directions with resultant downward flow of liquids relative to the dispersing plates 12.

Some or all of the intermediate compartments 14 are formed as expansible chambers and are situated in part within the column 11 and in part outside of it; the latter part is enclosed in a cylinder 44 that communicates with the interior of the column through an opening in the column wall at a level between the plates and is provided with a floating piston 45 which thus forms a movable wall of the respective compartment 14, constituting a means for altering the effective volume of the compartment or contacting zone. While only two such cylinders are shown, it is understood that all compartments 14 may be supplied therewith. The openings in the column for the cylinders 44 may be at any level within the zone, e. g., at the mid-level thereof as shown. A fixed stop member 46 projecting inwardly from the wall of the cylinder limits the inward movement of the piston 45 (in the direction which decreases the volume of the compartment). The cylinder is provided with an adjustable stop member 47 which may be adjusted in any of the various ways, either manually or automatically, to limit the outward movement of the piston 45 at desired displacements thereof. Thus, the stops may be adjusted manually at any axial position and clamped there by set screws 48, so that the displacement of the piston between positions of engagement with the stops 46 and 47 is equal to the desired $\Delta V$.

The adjustable stop 47 is preferably actuated automatically by any suitable positioning mechanism controlled by a liquid-liquid interface level-responsive device that measures the apparent liquid-liquid interface in the contacting zone with which the stop is associated, thereby automatically varying the piston displacement $\Delta V$ from time to time as required. A level-responsive device and stop positioning mechanism are diagrammatically shown herein and are merely indicative of known level-responsive and positioning devices that may be used. In the embodiment shown, a float chamber 49 is connected to the upper and lower parts of each compartment 14 by large conduits 50 and 51 and contains a float 52 that has a buoyancy to assume a position at the interface between the lighter and heavier liquids. The float is pivotally connected at 53 and 54 to levers 55 and 56 that extend out of the float chamber and are fulcrumed in the wall of the chamber and sealed thereto against leakage of liquid. The outer ends of the levers are pivotally connected to a link 57 having an intermediate notch 57a that provides a pair of abutments for moving a rod 58 up or down about a fixed pivot 59. The free end of rod 58 is pivotally connected to one end of a link 60, the other end of which is pivotally connected to the movable end of a second link 61 having a fixed pivot 62. A third link 63 is pivotally connected between the stop 47 and the link 60. It is evident that when the interface level in the chamber 49 rises the float 52 also rises, thereby depressing the link 57 and rotating the rod 58 counterclockwise. This rotates the link 61 in a clockwise direction and moves the stop member 47 to the right, to increase the displacement of the piston 45. Similarly, a drop in the interface level causes the stop member 47 to be moved to the left. This specific relation between the direction of the stop movement and the change in the interface level is intended for the situation described below, wherein the volume of the relatively lighter liquid tends to decrease in relation to that of the heavier liquid; when the volume of the lighter liquid tends to increase in relation to that of the heavier liquid the linkage is arranged to move the stop 47 to the left when the interface level rises.

It should be understood that the level-responsive devices may be disposed inside of the contacting zones 14 instead of in separate float chambers, and may use other sensing devices not employing floats, as known in the art.

Sight level means, such as a sight glass 64, may be provided for each compartment to indicate the apparent interface level therein. This may be used as a check on the operation of the device or to guide the operator in making manual adjustments in the position of the stop member from time to time during the operation of the process.

It will be noted that the outer end of each cylinder 44 is closed and that the piston 45 divides the cylinder into inner and outer spaces 65 and 66, respectively. Each outer space 66 is connected by a conduit 67 and valve 68 to a variable pressure conduit 69 which is connected to any fluid pump means for alternately forcing fluid into the spaces 66 and withdrawing fluid from these spaces. For example, the conduit 69 may be connected to the conduits 34 and 38 by valves 70 and 71, respectively. In operation, only one of the latter valves is open and the other is closed, while the valves 68 are normally open. The selection of the connection of the conduit 69 depends on the direction in which the liquid-liquid interface tends to move due to changes in the relative volumes of the liquid phases. In the example to be described, wherein the lighter liquid tends to decrease in volume relatively to the heavier liquid tending toward a rise in the interface level, the valve 70 is opened, placing each space 66 into communication with the surge pump 36, and the valve 71 is closed; when the relative volume change occurs in the opposite sense, the valve 70 is closed and valve 71 is opened, placing the spaces 66 into communication with the surge pump 40. When the pressure in the conduit 69 and spaces 66 exceeds the pressure in the contacting zones 14 the floating pistons 45 are moved to the left to the positions determined by the stops 46, whereby decreasing the effective volumes of the zones; when the pressure in the conduit 69 and spaces 66 is less than that in the contacting zones the pistons move to the right until they engage the stops 47. Thus, the floating pistons are actuated by fluid pressure.

The invention is not limited to actuation of the floating pistons by fluid pressure derived from the surge pumps and any other suitable operating device may be employed, such as an auxiliary pump 72 connected to conduit 69 through a valve 73 and having a piston 74 or other means responsive to the pressure in some part of the system, such as the inlet conduit 18 or 19.

*Operation*

The invention may be employed for extracting a petroleum hydrocarbon fraction, which is the lighter liquid, with a selective solvent such as furfural, which is the heavier liquid. These are admitted through the inlet conduits 19 and 18, respectively and flow countercurrently through the column until each contacting zone 14 contains some of each of these liquids. In each zone the heavier liquid settles to the bottom and the lighter liquid rises to the top, so that there is a body of substantial thickness of liquid phase consisting substantially only of the heavier liquid on the upper side of each perforated dispersing plate 12 and a body of substantial thickness of liquid phase consisting substantially only of the lighter liquid in contact with the lower side of each dispersing plate. The openings 13 in the plates are of such dimensions as to result in flow resistance great enough to prevent any appreciable liquid movement through the openings caused only by the difference in specific gravities of the liquids. Now the two counter-flowing liquids are alternately dispersed, one into the other, by alternately forcing the liquids through the openings 13, and contacted lighter and heavier liquids are withdrawn through the conduits 22 and 23, respectively. Each half-cycle may occupy an extended time, e. g., one quarter to five minutes. Several modes of operation are possible and will be described in succession.

In the first mode, pressure for effecting the dispersions is derived entirely or primarily from the feed pumps, valves 35, 39, 70 and 71 are closed and the pumps 36 and 40 are not used. The valves 68 and 73 are open. In the first half-cycle of the operational cycle the light liquid valves 21 and 24 are open and the heavy liquid valves 20 and 25 are closed; all pistons 45 are at the left, whereby the contacting zones have their minimum volumes. A measured amount $V_1$ of lighter liquid, preferably less than the volume of light liquid contained in one contacting zone, is admitted under pressure by pump 33 to the lower settling zone 16, the quantity being measured, for example, by reference to the change in level in the measuring tank 32. For example, the tank 32 may be tall and of small cross section and be filled from the conduit 30 to a first predetermined level, and thereafter liquid may be withdrawn by the pump 33 to a second predetermined level; this may be done automatically by providing level responsive devices (not shown, but known per se) for closing the valve 31 when the first predetermined level is reached and stopping the pump when the second predetermined level is reached. A volume $V_1$ of light phase is forced upwards through openings in the lowermost dispersing plate 12 into continuous layer of heavy liquid phase in the contacting zone, and light phase is forced upwards from said zone through the next plate 12 and is dispersed into the adjoining layer. This action is repeated in each zone, whereby a dispersion of light liquid phase in heavy liquid phase is formed above each plate and previously settled light phase is forced from the upper settling zone 15 and discharged through the conduit 22.

Without controls, i. e., were the contacting zones of fixed volumes, the same volume $V_1$ would flow through each dispersing plate and through the conduit 22. However, in accordance with the invention, the piston 74 is retracted by suitable means, not shown, during this half-cycle to reduce the pressure in the conduit 69 and spaces 66, causing the floating pistons 45 to move to the right until stopped by the adjustable stops 47 and increasing the effective volume of each zone by an amount equal to the displacement of the respective pistons. These displacements are denoted $\Delta V_1$, $\Delta V_2$, etc., for the successive zones, starting from the bottom and may, but need not be, equal. Hence, the volume of light phase expelled from the lowermost zone 14 and dispersed into the body of heavy liquid in the next zone 14 is equal to $(V_1-\Delta V_1)$; that expelled from the said next zone 14 is equal to $(V_1-\Delta V_1-\Delta V_2)$ and $E_1$, the volume of light phase discharged through the conduit 22, is equal to $(V_1-\Sigma \Delta V)$, where $\Sigma \Delta V$, called the aggregate change in volume, is the sum of all displacement of the pistons 45. This aggregate change compensates for the decrease in the volume of the light liquid in flowing through the entire series of contacting zones due to transfer of a component thereof to the heavier liquid, during a complete cycle, while the individual $\Delta V$'s compensate approximately for the decrease in volume occurring in the individual contacting zones. When only some of the contacting zones, less than all, are of variable volume, each $\Delta V$ is obviously greater than the decrease in volume that occurs in one zone during a complete cycle.

The dispersed droplets of light phase settle upwards through the continuous bodies of heavy phase and replenish light phase in the upper parts of the respective zones.

During the second half-cycles of the operational cycle, the valves 21 and 24 are closed and valves 20 and 25 are open and a volume $V_2$ of the heavier liquid is delivered to the upper settling zone 15, the quantity $V_2$ being preferably less than the volume of heavy liquid contained in one contacting zone. This volume may be selected independently of $V_1$; thus, it may be equal to $V_1$ or smaller or greater, depending upon the amount of selective solvent required to extract a desired amount of components from the lighter liquid. This causes a volume $V_2$ of the heavier liquid to be dispersed downwards through the openings in the uppermost dispersing plate 12 into the continuous body of light liquid phase in the adjoining contacting zone and heavy liquid phase is similarly dispersed downwardly through each dispersing plate into an adjoining body of light liquid phase. The piston 74 is, during this half-cycle, advanced to increase the pressure in the conduit 69 and spaces 66, causing the pistons 45 to move to the left until stopped by the fixed stops 46 and decreasing the effective volumes of the zones by the amounts equal to their increases during the first half-cycle. Hence, the volume of heavy phase expelled from the bottom of each contacting zone 14 exceeds the volume admitted into the same zone, and the volume of heavy phase discharged through the conduit 25 is equal to $(V_2+\Sigma \Delta V)$. In this manner, the contraction of the expansible contacting zones increases the volume of heavier liquid that is discharged through the withdrawal conduit 25 to compensate for the increase in volume of the heavier liquid due to transfer of a component from the lighter liquid.

The dispersed droplets of heavy phase settle downwards through the continuous bodies of light phase and replenish the heavy phase in the lower parts of the respective zones. When this settling has been completed, the interface levels in the several compartments are substantially the same as at the start of the first half-cycle. If the levels tend to rise after one or more complete cycles the adjustable stops 47 are moved to the right to increase the aggregate change of volume, either manually or automatically by the float mechanism, each stop 47 being preferably individually adjustable.

Although $V_1$ and $V_2$ are preferably less than the volumes of like liquids contained within one contacting zone, viz., less than half the minimum volume of one zone, greater values of $V_1$ and $V_2$ may be used under some conditions, as when the liquid phases settle rapidly.

It is desirable, although not essential, to distribute the contacting zones that have variable effective volumes along the height of the column, e. g., by making each chamber or alternate chamber expansible, whereby the aggregate change of volume is distributed among the contacting zones.

Although the foregoing is a possible mode of operating, and was first described to illustrate the novel feature of the invention as applied to method in its simplest form, such mode is not preferred because undesirably long delay periods must be provided to settle the dispersions formed in the contacting zones. Usually the settling of the dispersions formed in one half-cycle is not completed by the time the subsequent half-cycle is begun and minor amounts of very small droplets of each liquid that are slow in settling are still in suspension in the other liquid. Hence, a minor amount of lighter liquid is re-dispersed downwardly through the plates 12 with the heavier liquid while a minor amount of heavier liquid is re-dispersed upwardly with the lighter liquid. To compensate for this recycling it is necessary to flow through the dispersing plates during each half-cycle a greater volume of liquid than the net volume of the same liquid that traverses the plates in one direction in the course of a complete cycle. This increase in the liquid flow may be brought about by any of several means, one of which is described in the second mode of operation, being a preferred mode:

The operation is as was described for the first mode, with the exception that the valves 35 and 39 are opened to connect the settling zones 15 and 16 to the surge pumps 36 and 40, and the pistons 37 and 41 are operated in synchronism with the flow of the liquids into the column in the sense that the pistons are moved toward the left during the first half-cycle wherein lighter liquid is introduced and are moved toward the right during the second half-cycle wherein heavier liquid is introduced. The reciprocating movements of the pistons may be slow so as to extend throughout the respective half-cycles, or more rapid, so as to be completed during a portion of the cycle, e. g., at the beginning, prior to or during the early part of the time that feed liquid is supplied or at the end, during the last part of or subsequent to the time that feed liquid is supplied to the column. When a surge pump makes a suction stroke it draws liquid from the respective settling zone. It is not important whether the lighter or heavier liquid is drawn in; however, it is preferred to connect the conduits 34 and 38 towards the ends of the column beyond the interface levels in the settling zones, whereby the conduit 34 receives settled lighter liquid and the conduit 38 receives settled heavier liquid.

It is evident that in this mode of operation during the first half-cycle there is supplied into the lower settling zone 16 a volume $V_1$ of light liquid from the conduit 19 and in addition a volume $V_3$ of liquid (either heavy or light) from the surge pump 40, so that there is dispersed through each dispersing plate a volume of lighter liquid that exceeds the volumes according to the first mode of operation by the quantity $V_3$. During this half-cycle the pump 36 draws in a volume $V_4$, so that the quantity of lighter liquid discharged through the outlet 24 is $$(V_1+V_3-V_4-\Sigma\Delta V)$$

During the second half-cycle there is supplied into the upper settling zone 15 a volume $V_2$ of heavy liquid from the conduit 18 and in addition a volume $V_4$ of liquid (either heavy or light) from the surge pump 36, so that there is dispersed through each dispersing plate a volume of heavier liquid that exceeds the volumes according to the first mode of operation by the quantity $V_4$. During this half-cycle pump 40 draws in a volume $V_3$, so that the quantity of heavier liquid discharged through the outlet 23 is $(V_2-V_3+V_4+\Sigma\Delta V)$.

In this mode of operation, the strokes of the surge pumps may be kept relatively small, e. g., to make $V_3$ and $V_4$ small in relation to $V_1$ and $V_2$, e. g., about one-tenth to one-half thereof.

When the surge pumps are used, as in the second mode of operation and in the third mode, to be described, it is unnecessary to employ a separate pump 72 to actuate the floating pistons 47. Thus, if desired, the valve 73 may be closed and the valve 70 or 71 opened depending on whether lighter liquid decreases or increases in volume. When valve 70 is open the pressure in the conduit 69 will be automatically decreased during each first half-cycle for expanding the contacting zones when the lighter liquid is dispersed upwards and increased during each second half-cycle for contracting the contacting zones when the heavier liquid is dispersed downwards.

According to a third mode of operation valves 35 and 39 are open and the surge pumps 36 and 40 are used to provide all of the power required to disperse the liquids through the dispersing plates and the liquids may be supplied to the column through the conduits 18 and 19 at comparatively low pressures. The surge pumps are made larger or at least given longer strokes than in the second mode. Again assuming that the lighter liquid decreases in volume, the valve 70 is open and the valve 71 is closed when the pump 72 is not used. In this mode, at the start of each first half-cycle the surge pump 36 is empty and the surge pump 40 is filled, the pistons 37 and 41 being at the right. Valves 21 and 25 are closed and the valves 20 and 24 are open, preferably by cam-operated mechanisms (not shown) responsive to the driving mechanism for the surge pumps and coordinated with the operation of said pumps. The pistons 47 are at the left, whereby the contacting zones are at minimum volumes.

During the first half-cycle, a volume $V_2$ of heavy liquid is delivered to the upper settling zone 15 through feed conduit 18, a volume $E_1$ of settled light phase is withdrawn from the upper settling zone 15 through exit conduit 22, and the surge pumps are operated to deliver a volume $V_3$ of liquid, e. g., settled heavy phase, from the surge pump 40 to the lower settling zone 16, and to withdraw a volume $V_4$ of liquid, e. g., settled light phase, from the upper settling zone 15 into the surge pump 36. The flow from the surge pump 40 forces a volume $V_3$ of lighter liquid upwards through the lowermost dispersion plate 12 into the continuous body of heavy phase in the adjoining contacting zone 14 to form a dispersion. Concomitantly, the pressures within the conduit 69 is lowered by the suction stroke of the surge pump 36, causing the pistons 47 to retreat to the right to the extent limited by the adjustable stops 47, enlarging the effective volumes of the contacting zones by increments $\Delta V_1$, $\Delta V_2$, etc. Hence, a volume of light phase equal to $(V_3-\Delta V_1)$ is expelled from the top of said contacting zone through the second dispersing plate, this action being repeated at each dispersing plate to form a dispersion above each plate, the volume of light phase dispersed upwards being incrementally smaller. It is evident that the liquid dispersed through the uppermost plate into the settling zone 15 is $(V_3-\Sigma\Delta V)$ and that, for a material balance, the volume of liquid discharged, $E_1$, is equal to $(V_2+V_3-V_4-\Sigma\Delta V)$. In this manner, the volume of lighter liquid forced through a given perforated plate is decreased below that volume which is simultaneously forced through the next lower plate. The decrease thus effected in the volume of light liquid which is forced through consecutive plates compensates at least in part for the relative decrease in volume of the lighter liquid phase in a given contacting zone resulting from component transfer accompanying the contacting operation. Each dispersion settles by upward flow of the light phase.

During the second half-cycle the valves 20 and 24 are closed, the valves 21 and 25 are opened, a volume $V_1$ of lighter liquid is delivered to the lower settling zone 16 through feed conduit 19, a volume $E_2$ of settled heavy phase is withdrawn from the lower settling zone 16 through exit conduit 23, and the surge pumps are operated to deliver a volume $V_4$ of liquid, e. g., settled light phase, from surge pump 36 to the upper settling zone 15 and to withdraw a volume $V_3$ of liquid, e. g., settled heavy phase, from the lower settling zone 16 into the surge pump 40. The flow from the surge pump 36 forces a volume $V_4$ of heavier liquid downwards through the uppermost dispersion plate 12 into a continuous body of light phase in the adjoining contacting zone 14 to form a dispersion. Concomitantly, the pressure within the conduit 69 is increased by the delivery stroke of the surge pump 36, causing the pistons 47 to advance to the left to the extent limited by the fixed stops 46, decreasing the effective volumes of the contacting zones by the increments described above. Hence, a volume of heavy phase is expelled from the bottom of each contacting zone that exceeds the volume that is simultaneously forced into the zone through the next higher plate, forming a dispersion immediately beneath each plate. This increase in the volume of heavier liquid forced through a next lower plate compensates at least in part for the volume increase of the heavier phase on account of solute transfer. It is evident that the volume of the heavy phase discharged, $E_2$ is equal to $$(V_1-V_3+V_4+\Sigma\Delta V)$$

It is evident that $V_1$ and $V_2$, the volumes of liquid fed to the column in each cycle, may be selected in any desired ratio dictated by the nature of the liquids and the effect desired to be achieved by the contacting operation. Each of the quantities is preferably made smaller than the volume of like liquid contained in one contacting zone, i. e., less than half the minimum volume of one zone, although under some conditions, when the liquids settle rapidly, somewhat greater quantities may be used during each half-cycle. To insure that the quantity of liquid that is dispersed during each half-cycle exceeds the net volume of the same liquid that traverses the plates in one direction in the course of a complete cycle, to allow for recycling, $V_3$ is advantageously made somewhat greater than $V_1$, and $V_4$ is made somewhat greater than $V_2$, e. g., from one-tenth to one-half greater. The ratio of $V_3$ to $V_4$ may thus be approximately the same as the ratio of $V_1$ to $V_2$ and may be controlled by the cross-sectional areas of the surge pumps, while the magnitudes of $V_3$ and $V_4$ may be varied simultaneously by varying the lengths of the strokes of the surge pump pistons.

In none of the three modes of operation was an attempt made to control the apparent interface levels during a half-cycle. Since the relative volume changes in the two halves of the complete cycle generally will not be the same and since primarily different liquids are transferred during alternate half-cycles, a control of the interface level by increasing the volume of a contacting zone during one-half-cycle will not, when the volume of the contacting zone is again reduced, exactly compensate for relative volume changes between the liquid phases due to solute transfer during that half of the cycle. However, if the greater change in relative volume is made subject to the enlargement or contraction of the effective volume of the zone to maintain a substantially constant apparent interface level, the other and smaller relative change will not shift the interface level appreciably. Furthermore, such a shift will be corrected in a subsequent half-cycle. Of course, positions for the stops 47 may be selected manually and by trial, with or without calculations, to result in a substantially constant level so long as other operating conditions are maintained the same, subject to occasional corrections as suggested by the levels in the sight glasses 64.

In the foregoing, reference was made to the apparent interface levels. These are not necessarily the same as the actual interface levels occurring in the contacting zones. For example, when the lighter liquid is dispersed into the heavier liquid from below, the overall bulk of the layer of heavier liquid increases and its upper boundary rises, changing the actual interface level; however, this bulk of heavy liquid is made up in part of dispersed, lighter liquid, so that the pressure difference between the legs of the sight glass 64 or the legs 50 and 51 of the float chamber 49 is not changed thereby. These parts, thereby indicate an apparent interface level, which is substantially the actual level that would result if the dispersion were allowed to settle completely.

While the method and apparatus were described with reference to a preferred embodiment thereof, it will be understood that various modifications coming within the scope of the invention may be utilized. Thus, while the dispersing plates 12 were rigidly secured to the walls of the column 11 and surge pumps were used, it is also possible to move the plates in unison in reciprocating oscillatory motion, as disclosed in the aforesaid patent to Van Dijck, No. 2,011,186, the movement being limited so that the cylinders 43 remain in communication with the same contacting zones.

The openings through the perforated plates may vary in size between rather wide limits. They should be sufficiently large to permit fluid to flow therethrough under a pressure differential which is not unduly large. Furthermore, the dimensions of the openings must be selected so as to yield a satisfactory dispersion of the liquids, one into the other, under the desired operating conditions of temperature, total pressure, pressure differential across a plate, viscosities of the liquids, etc. The actual size of the openings is not critical since even in fairly large openings, even up to one-eighth to one-fourth of an inch in diameter, satisfactory dispersion can be obtained by increasing the jet velocity of the liquid being forced through the openings by applying sufficient pressure. As an illustration of a suitable opening size, perforated plates with openings of the order of about twenty-five to seventy-five thousandths of an inch diameter have given good results with a water-methylisobutyl ketone-acetic acid system. Perforated plates with openings which are too large to yield satisfactory dispersions alone with some systems may be provided with angular members, such as cones, wedges, inclined planes, etc., disposed in front of the openings and cooperating with said openings to disperse the liquid jets issuing from the openings and impinging on such members.

The selection of a surge pump or surge pumps will depend on the requirements of the given process. For example, a simple single-cylinder pump with a double-acting piston may be used if the volumes of the two liquids to be dispersed ($V_1$ and $V_2$) are the same. For sake of flexibility, however, it is generally preferable to utilize separate surge pumps having different displacements, as illustrated in the drawing wherein the pump 40 has a greater diameter than the pump 36. The pistons may be driven from a common driving shaft and driving mechanism or from different ones with the piston displacements thereof being out of phase.

The utility and advantage of the method and apparatus of the present invention are demonstrated by the data shown in the table below. A contactor of the fixed-plate type as described in the van Dijck Patent No. 2,011,186, was operated beginning with two-phase (dual) dispersion, but after a short period of time it became essentially a single-dispersion operation with a ratio of light to heavy liquid within the individual compartments of only about one-tenth. When operating under the conditions described herein for the third mode, to maintain a ratio of light to heavy phase of about one to one, the plates in the column continued to operate as double (dual) dispersing plates:

| Ratio of Light to Heavy Phase | Thickness of Layer of Light Phase | Efficiency of four-plate contactor | |
|---|---|---|---|
| | | Stages | Percent |
| About 0.1 | about 0.2 in. | 2.5 | 63 |
| About 1.0 | about 1.0 in. | 3.8 | 95 |

Figure 2:
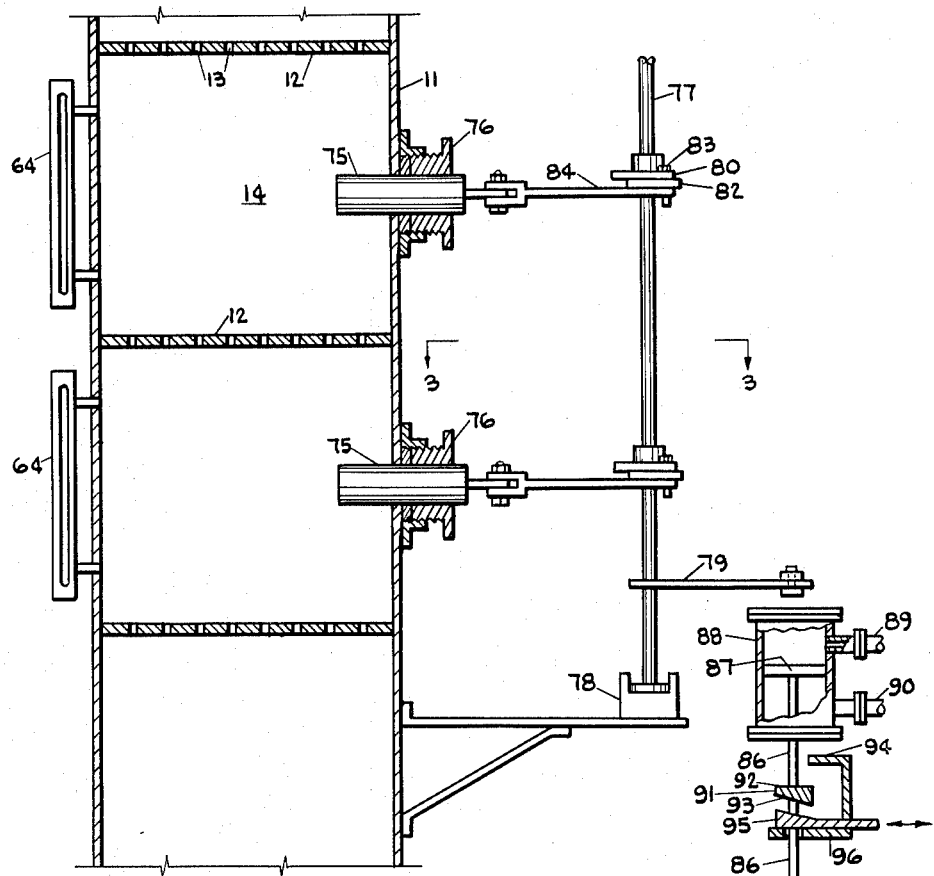
Fig. 2 is a fragmentary vertical sectional view, partly in elevation, showing a modified arrangement for altering the volumes of the contacting zones.
Figure 3:
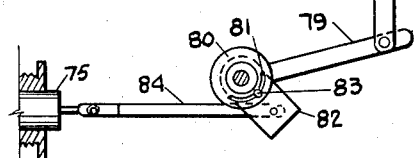
Fig. 3 is a section taken on line 3—3 of Fig. 2.

Figs. 2 and 3 illustrate an alternate arrangement for altering the effective volumes of the contacting zones. Here the contacting zones 14, defined by the walls of the column 11 and the dispersing plates 12 having perforations 13, are provided with plungers 75 that are reciprocably mounted in the wall, and sealed by packing glands 76. The plungers are actuated by a vertical shaft 77 having a lower support 78 and a driving lever arm 79 by which it may be given reciprocating rotary movement. Fast to the shaft opposite each plunger is a collar 80 having an arcuate slot 81. An actuating arm 82, rotatable about the shaft, extends radially therefrom beneath each collar. The arms are bolted to the collar in adjusted orientations by bolts 83 extending through the slots 81. The outer end of each arm is connected pivotally to one end of a link 84, the other end of which is connected pivotally to a plunger 75. The driving lever arm 79 may be driven in synchronism with the flow of liquids alternately through the perforations of the dispersing plates 12 by any suitable means. For example, this arm may be connected through a pivoted link 85 to the rod 86 of a double acting piston 87 that is reciprocable within a cylinder 88. Conduits 89 and 90 communicate with the cylinder near the ends thereof and may be connected to the end chambers of the column so that the piston is reciprocated in synchronism with the pressures applied to the end zones of the column. The rod 86 carries a stop 91 having a pair of abutment faces 92 and 93 of which the latter is inclined, cooperating respectively with a stationary stop 94 and a movable wedge stop 95. The latter is adjustable on the support 96 to control the stroke of the stop 91.

In operation, the shaft 77 is rotated in one direction through a suitable angle while the heavier liquid is being dispersed downwards through the dispersion plates and is rotated in the opposite direction through the same angle while the lighter liquid is being dispersed, thereby reciprocating the plungers 75 in unison and altering the effective volumes of the contacting zones. The operation of the column itself may be as described heretofore and the rotation of the shaft 77 is such as to decrease the volume of each contacting zone (i. e., push the plunger farther into the column) during the dispersion of the liquid that increases in volume and to increase the volume of each contacting zone during the dispersion of the other liquid. The lever 79 is oscillated by the piston 87 in synchronism with the relative movements between the dispersion plates and the liquids in the column. The changes in the effective volumes of the several contacting zones $\Delta V_1, \Delta V_2$, etc. are equal to the displacements of the plungers, i. e., the product of their cross-sectional areas and strokes.

The relation of the plunger displacements to each other can be adjusted by adjusting the orientations of the individual arms 82 about the shaft 77 by sliding the bolts 83 in the slots on the collars and fastening the bolts. Thus, if the arm 82 of Fig. 3 were adjusted in a more clockwise position, to make it more nearly perpendicular to the link 84, the stroke of the plunger and, hence, the displacement thereof would be increased when the shaft 77 is rotated through a given angle; conversely, adjusting the arm to be inclined away from the perpendicular to the link 84 decreases the displacement of the plunger. Such individual adjustments of the arms 82 may be made from time to time by observing the interface levels in the several sight glasses 64. The angle through which the shaft 77 is rotated during each half-cycle can also be varied to maintain the apparent interface levels constant by adjusting the position of the wedge stop 95, it being evident that this increases or decreases the displacements of all plungers. The position of the wedge stop 95 may be adjusted automtaically by a liquid-liquid interface level responsive device that senses the level of the interface level in a selected intermediate compartment, e. g., as shown in Fig. 1.

The method and apparatus of this invention, applied to supplement another method and arrangement for compensating for changes in interface level, are claimed in our copending application Serial No. 709,008, filed November 9, 1946.

We claim as our invention:

1. Method of contacting at least partially immiscible liquids having relatively different densities the first of which liquids increases in volume relatively to the second liquid upon being contacted therewith, which comprises the steps of establishing a continuous body of substantial depth of each of said liquids in contact with each other within a confined contacting zone bounded in part by a first dispersing member having restricted flow openings in contact with the body of lighter liquid and in part by a second dispersing member having restricted flow openings in contact with the body of heavier liquid; establishing a continuous body of heavier liquid outside of said contacting zone in contact with the first dispersing member; establishing a continuous body of lighter liquid outside of said contacting zone in contact with the second dispersing member; alternately (a) dispersing lighter liquid from each of said bodies of lighter liquid through the openings of the respective dispersing members in contact therewith into the continuous bodies of heavier liquid that are in contact with the respective dispersing members and (b) dispersing heavier liquid from each of said bodies of heavier liquid through the openings of the respective dispersing members in contact therewith into the bodies of lighter liquid that are in contact with the respective dispersing members; and maintaining each of said bodies within said contacting zone at a substantial depth during an extended sequence of alternate dispersions by decreasing the effective volume of said contacting zone during the dispersion of the said first liquid and increasing the effective volume of said contacting zone during the dispersion of the said second liquid.

2. The method of intimately contacting two at least partially immiscible first and second liquids having relatively different densities in a series of confined contacting zones which are serially connected through restricted flow zones which comprises establishing a body of substantial depth of each of said two liquids in each of said contacting zones, the combined volumes of the two bodies in each contacting zones being such as to fill completely the respective contacting zones; alternately (a) dispersing first liquid simultaneously from each of at least two consecutive contacting zones into separate bodies of the second liquid in respectively adjacent contacting zones by flowing first liquid through consecutive restricted flow zones toward the same end of the series, whereby new first liquid flows into the intermediate contacting zone that lies between said two consecutive restricted flow zones and first liquid which was previously therein simultaneously flows out of said intermediate contacting zone, and (b) dispersing second liquid simultaneously from the said adjacent contacting zones into separate bodies of the first liquid in the said two consecutive contacting zones by flowing second liquid through the same consecutive restricted flow zones but in the opposite direction, whereby new second liquid flows into the said intermediate contacting zone and second liquid which was previously therein flows out of said intermediate contacting zone; and regulating the relative volumes of the same liquid flowing into and out of the said intermediate contacting zone during each dispersion so as to maintain a substantial depth of each of said bodies of liquid in said intermediate contacting zone over an extended sequence of alternate dispersions by alternately increasing the effective volume of said intermediate contacting zone and decreasing the effective volume of said intermediate contacting zone in the course of a complete cycle of alternate dispersions.

3. The method according to claim 2 wherein the effective volume of the intermediate contacting zone is increased and decreased by withdrawing liquid therefrom into an auxiliary space each alternate dispersion and returning the withdrawn liquid to said intermediate contacting zone during the intervening dispersions.

4. The method of intimately contacting two at least partially immiscible first and second liquids having relatively different densities and having a tendency, upon being contacted, to undergo an increase in the volume of the first liquid relatively to that of the second liquid, in a series of confined contacting zones which are serially connected through restricted flow zones, at least one intermediate contacting zone having means for varying the effective volume thereof, which comprises establishing a body of substantial depth of each of said two liquids in each of said contacting zones, the combined volumes of the two bodies in each contacting zone being such as to fill completely the respective contacting zone and the body of the second liquid being in each contacting zone toward the restricted flow zone toward the first end of the series and the first liquid being in each contacting zone toward the restricted flow zone toward the other end of the series; alternately (a) dispersing first liquid simultaneously from each of said contacting zones except the last in the series into separate bodies of the second liquid in respectively adjacent contacting zones toward said other end by forcing first liquid to flow from the first contacting zone through the first restricted flow zone into the second contacting zone, thereby introducing new first liquid into and displacing first liquid which was previously therein to flow out of each contacting zone other than the first, and (b) dispersing second liquid simultaneously from each of said contacting zones except the first in the series into separate bodies of the first liquid in respectively adjacent contacting zones toward said first end by forcing second liquid to flow from the last contacting zone through the last restricted flow zone into the next to last contacting zone, thereby introducing new second liquid into and displacing second liquid which was previously therein to flow out of each contacting zone other than the last; and maintaining a substantial depth of each of said bodies of liquid in said intermediate contacting zone by regulating the relative volumes of new liquid flowing into and of previously present liquid displaced from said intermediate contacting zone by decreasing the effective volume of said intermediate contacting zone when the first liquid is dispersed into the second liquid and increasing the effective volume of said intermediate contacting zone when the second liquid is dispersed into the first liquid.

5. Method of intimately contacting two at least partially immiscible, relatively lighter and heavier liquids, the second of said liquids containing a component which is soluble in said first liquid and which, when transferred from said second liquid to said first liquid upon contact of the two liquids results in a relative volume increase in said first liquid and a relative volume decrease in said second liquid, which comprises the steps of establishing a first body of said first liquid in surface contact with one side of a first perforated dispersing member and separated thereby from a first body of substantial thickness of said second liquid within a confined zone and in surface contact with the other side of said first dispersing member, a second body of substantial thickness of said first liquid within said confined zone and in horizontal liquid-liquid interfacial contact with said first body of second liquid and in surface contact with one side of a second perforated dispersing member and separated thereby from a second body of said second liquid; alternately dispersing said liquids through said dispersing members one into the other, the dispersion of a given one of the liquids at the different dispersing members being simultaneous; and alternately increasing and decreasing the effective volume of the said confined zone occupied by the two bodies of liquid between the first and second dispersing members in unison with the alternate dispersions, the volume being increased by an incremental volume during the dispersion of the second liquid into the first liquid and decreased by the same incremental volume during the dispersion of the first liquid into the second liquid, said incremental volume being such as to maintain the apparent horizontal liquid-liquid interface in said confined zone substantially the same before and after a completed cycle of alternate dispersions.

6. An apparatus for intimately contacting at least partially immiscible liquids having different densities comprising, in combination: a series of more than two adjoining enclosed chambers separated by intervening walls and being serially connected through orificial openings in said intervening walls; a pair of feed conduits for the liquids to be contacted communicating with chambers respectively at the ends of the series; a pair of withdrawal conduits for the contacted liquids communicating with chambers respectively at the ends of the series; means for causing relative movements between the liquids in said chambers, on the one hand, and said intervening walls, on the other hand, alternately in opposite directions whereby said liquids are made to flow through said orificial openings alternately in opposite directions; and additional means for alternately increasing and decreasing the effective volume of at least one intermediate chamber of said series.

7. Apparatus according to claim 6 wherein the means for increasing and decreasing the effective volume of said intermediate chamber comprises a wall forming a part of the boundary of said chamber and mounted movably in relation to the other walls of the chamber to alter the effective volume of the chamber, and means for moving said movably mounted wall.

8. Apparatus according to claim 7 wherein said intermediate chamber comprises a portion having an interior cylindrical surface and a closed outer end and the said movably mounted wall is a free piston movable in said cylindrical portion and defining a closed space between itself and the said closed outer end of the cylindrical portion; and the means for moving said movably mounted wall comprises a conduit connected to said closed space and to fluid pump means for alternately (a) forcing fluid into the closed space to advance the floating piston inwardly and decrease the effective volume of the said chamber and (b) withdrawing fluid from the closed space to permit liquid within the chamber to move the floating piston outwardly and increase the effective volume of the chamber.

9. Apparatus according to claim 6 wherein the means for increasing and decreasing the effective volume of said intermediate chamber comprises a plunger located partly within and partly outside of said chamber and reciprocably mounted for movement farther into the chamber to decrease the effective volume thereof and farther out of the chamber to increase the effective volume thereof, and means for moving the plunger reciprocably.

10. Apparatus according to claim 6 wherein the means for alternately increasing and decreasing the effective volume of said intermediate chamber comprises actuating means responsive synchronously to the action of the said means for causing relative movements between the liquids and the intervening walls, whereby the effective volume is increased each time one of said liquids flows through the openings in one direction and the effective volume is decreased each time the other of said liquids flows through the openings in the opposite direction.

11. Apparatus according to claim 6 wherein the means for alternately increasing and decreasing the effective volume of said intermediate chamber comprises a member mounted movably in relation to the other walls of the chamber to change the effective volume of the chamber and adjustable stop means limiting the extent of movement of said member, whereby the magnitude of the change in the effective volume of the chamber can be regulated.

12. In combination with the apparatus according to claim 11, a liquid interface level responsive device mounted to sense the level of the apparent liquid-liquid interface in said intermediate contacting compartment; and means responsive to said device for adjusting the position of said adjustable stop in accordance with the position of the said level of the apparent interface.

13. An apparatus for intimately contacting at least partially immiscible liquids having different densities comprising in combination: a vessel having a pair of feed conduits for the liquids to be contacted communicating with the vessel near opposite ends thereof, respectively; a pair of withdrawal conduits for the contacted liquids communicating with the vessel near the same opposite end thereof, respectively; a plurality of dispersing members having orificial openings and disposed within said vessel between said conduits dividing said vessel into a series of contacting compartments situated between adjacent dispersing members; means for causing relative movement between liquids in said vessel and said dispersing members alternately in opposite directions, whereby said liquids are made to flow through said orificial openings alternately in opposite directions; and additional means for increasing the effective volume of at least one of said contacting compartments during flow of one liquid through said openings in one direction and for decreasing the effective volume of said one contacting zone during flow of the other liquid in the opposite direction.

14. An apparatus for intimately contacting at least partially immiscible liquids having different densities comprising, in combination: a vessel having a pair of feed conduits for the liquids to be contacted communicating with the vessel near opposite ends thereof, respectively; a pair of withdrawal conduits for the contacted liquid communicating with the vessel near the same opposite ends thereof, respectively; a plurality of dispersing members having orificial openings and disposed within said vessel between said conduits dividing said vessel into a series of contacting compartments situated between adjacent dispersing members; means for causing relative movement between liquids in said vessel and said dispersing members alternately in opposite directions, whereby said liquids are made to flow through said orificial openings alternately in opposite directions; each of a plurality of said contacting compartments having a wall forming a boundary thereof mounted movably in relation to the other walls of the respective compartment to alter the effective volumes of said plurality of contacting compartments.

15. In combination with the apparatus according to claim 14, common means for moving said movably mounted walls; and means for individually adjusting the extents of movements of said movably mounted walls, whereby the amounts by which the effective volumes of said plurality of contacting compartments are increased and decreased can be separately controlled.

16. In combination with the apparatus according to claim 15, a liquid interface level responsive device mounted to sense the level of the apparent liquid-liquid interface in said plurality of contacting compartments; and means responsive to said devices for adjusting the extents of movements of the said movably mounted walls of the corresponding contacting compartments in accordance with the position of said level of the apparent interface.

17. An apparatus for intimately contacting at least partially immiscible liquids having different densities comprising, in combination: a vessel having a plurality of perforated partitions forming dispersing members and spaced apart within the vessel to divide the vessel into a pair of end compartments and a series of intermediate contacting compartments serially connected through the perforations in said partitions, at least one of said intermediate compartments having a wall mounted movably in relation to the other walls of the respective compartment to alter the effective volume of said intermediate compartment; a pair of feed conduits for the liquids to be contacted communicating with said end compartments, respectively; a pair of withdrawal conduits for contacted liquids communicating with said end compartments, respectively; pressure-imparting means communicating with the two end compartments for alternately (a) increasing the pressure in one of said end compartments and decreasing it in the other end compartment to cause flow of liquid through the several dispersing members toward the latter end compartment and (b) decreasing the pressure in the former end compartment and increasing it in the latter end compartment to cause flow of liquid through the several dispersing members toward the former end compartment; and means for moving said movably mounted wall in synchronism with said pressure imparting means.

18. The apparatus according to claim 17 wherein the pressure-imparting means comprises a pair of surge pumps communicating respectively with said end compartments and connected to operate out of phase with one another, whereby one surge pump draws liquid from the end compartment connected thereto to decrease the pressure therein while the other surge pump forces liquid into the other end compartment to increase the pressure therein.

19. The apparatus according to claim 18 wherein the pressure-imparting means comprises a pair of pumps connected to said feed conduits and a flow control means on the withdrawal conduits, whereby liquid can be forced alternately into each end compartment and the pressure increased therein and simultaneously withdrawn from the other end compartment to decrease the pressure therein.

20. An apparatus for intimately contacting two at least partially immiscible liquids having different densities comprising, in combination: a vertical, elongated vessel; a plurality of vertically spaced transverse partitions having orificial openings disposed within said vessel and arranged to divide the vessel into at least one intermediate contacting compartment and into an upper settling compartment and a lower settling compartment, whereby all of said compartments are serially connected through said openings; a pair of feed conduits for the liquids to be contacted communicating with said settling end compartments, respectively; a pair of withdrawal conduits for contacted liquids communicating with said settling compartments, respectively; surge pump means providing a pair of cylinders and pistons, said cylinders communicating with the two settling compartments, respectively; means for operating said pistons out of phase, whereby one piston draws liquid from one settling compartment while the other piston forces liquid into the other settling compartment; an expansible chamber assembly comprising an auxiliary cylinder containing a piston dividing the cylinder into first and second spaces, the first space being in communication with said intermediate contacting compartment and the other space communicating with one of said settling compartments; means limiting movement of the piston in the auxiliary cylinder in one direction; a movable stop member limiting movement of the last-mentioned piston in the other direction; liquid interface level responsive means mounted to sense the level of the apparent liquid-liquid interface in said intermediate compartment; and means responsive to said interface level responsive means for adjusting the position of said movable stop member in accordance with changes in said apparent interface level.

References Cited in the file of this patent

UNITED STATES PATENTS

| | | |
|---|---|---|
| 2,011,186 | Van Dyck | Aug. 13, 1935 |
| 2,121,324 | Manley | June 21, 1938 |
| 2,400,378 | Stines | May 14, 1946 |
| 2,474,006 | Maycock | June 21, 1949 |